United States Patent [19]

Nishino

[11] Patent Number: 4,770,463

[45] Date of Patent: Sep. 13, 1988

[54] RECLINING DEVICE

[75] Inventor: Takaichi Nishino, Akishima, Japan

[73] Assignee: Tachi-S Co., Ltd., Akishima, Japan

[21] Appl. No.: 927,359

[22] Filed: Nov. 4, 1986

[51] Int. Cl.⁴ ............................................. A47C 1/026
[52] U.S. Cl. .................... 297/367; 248/430;
297/344; 297/366
[58] Field of Search ................ 297/363–371,
297/379, 344, 346; 248/429, 430

[56] References Cited

U.S. PATENT DOCUMENTS

| | | | |
|---|---|---|---|
| 4,154,422 | 5/1979 | Muhr | 248/429 |
| 4,394,048 | 7/1983 | Sakurai et al. | 297/367 |
| 4,527,767 | 7/1985 | Rees | 248/429 X |
| 4,564,236 | 1/1986 | Kluting et al. | 297/369 X |

FOREIGN PATENT DOCUMENTS

| | | | |
|---|---|---|---|
| 135596 | 4/1985 | European Pat. Off. | 297/344 |
| 2845281 | 4/1980 | Fed. Rep. of Germany | 297/366 |
| 39928 | 4/1981 | Japan | 297/344 |

Primary Examiner—Kenneth J. Dorner
Assistant Examiner—Peter R. Brown
Attorney, Agent, or Firm—Oldham & Oldham Co.

[57] ABSTRACT

A reclining device for use in an automotive seat is disclosed. Most parts of the reclining device are included within an upper rail of a slide rail to which a seat cushion is mounted. A sector gear with one end thereof fixed to a seat back is engaged with one of the parts included within the upper rail. The seat back can be rotated about the mounting portion of the sector gear to the upper rail and thus the angle of inclination of the seat back can be adjusted finely without impairing the sitting feeling of an occupant.

7 Claims, 4 Drawing Sheets

RECLINING DEVICE

BACKGROUND OF THE INVENTION

1. Field of the Invention

The present invention relates to a reclining device for use in an automotive seat and, more particularly, to such reclining device which is capable of arranging a seat back level with a seat cushion when the seat back is inclined back horizontally and also which eliminates the possibility that the lower end portion of the seat back may rub against the back and bottom of an occupant when the angle of inclination of the seat back is altered.

2. Description of the Prior Art

Conventionally, a general type of reclining device, as shown in FIG. 1, is mounted to a seat so as to extend between the respective side surfaces of a seat cushion (A) and a seat back (B). In such reclining device, the main parts of the reclining device are packaged in a united body and the united body is fixed to the seat cushion by bolts (103)(103) or similar fasteners, while a rotary member such as an arm (104) or the like provided in the seat back (B) is rotatably mounted to the seat cushion at a position located upwardly of the above-mentioned fixed position of the united body.

In other words, because the rotary member (104) of the seat back (B) must be mounted to the seat cushion (A) in such a manner that it can be rotated up to substantially 180 degrees relative to the seat cushion (A), the rotary member (104) of the seat back (B) must be located above the mounting positions of the bolts (103)(103), that is, the positions in which the reclining device is fixed to the seat cushion (A). Thus, the mounting portion (105) of the rotary member (104) to the seat cushion (A) becomes the center of rotation of the seat back (B).

Therefore, since the center of rotation of the seat back (B) is disposed at a position higher than the seat cushion (A), when the seat back (B) is inclined back horizontally, there is produced a difference in level between the seat cushion (A) and the seat back (B), (that is, the seat back (B) is situated higher than the seat cushion (A)).

In FIG. 1, reference numeral (101) designates an upper rail of a seat adjuster fixed to the seat cushion (A), and (102) a lower rail of the same fixed to the floor of an automotive seat.

Also, since this conventional reclining device is adapted such that the seat back can only be inclined back and forth, the center of rotation of the seat back is greatly away from the point of the occupant's hips, that is, a point corresponding the center of rotation of a man's body between the trunk and the thigh of the body. For this reason, each time the seat back is inclined, the lower end portion of the seat back is caused to rub against the back and bottom of the occupant, so that the occupant must re-sit to avoid such uncomfortable rubbing.

In view of the above-mentioned circumstances, the present application has developed an improved reclining device which can eliminate the above-mentioned drawbacks and has disclosed it in Japanese Patent Publication No. 70713 of 1981. In this reclining device, a movable arm to be fixed to a seat back is rotatably connected to a base plate to be fixed to a seat cushion via a link piece and a sector, and the four points of connection thereof are used to form a trapezoidal link mechanism. Also, the center of rotation of the movable arm is made to substantially correspond to a center of rotation between the seat back and the seat cushion.

However, since this reclining device employs the trapezoidal-node-type reclining mechanism, it is complicated in structure and the whole device is large in size. Therefore, when the reclining device is mounted to the outer surfaces of the seat back and seat cushion, the appearance of the seat may be impaired.

Also, the conventional general type of reclining device is mounted to the seat so as to extend across the outer side surfaces of the seat back and seat cushion after the seat is completed.

Therefore, since the reclining device is exposed out on the outer surface of the seat, the appearance of the seat is impaired, and there must be formed in frames, cushion members and the like which form the seat back mounting holes for fixing the reclining device. Further, since these mounting holes are covered with a trim cover assembly, when the reclining device is mounted to the seat, the mounting position of the reclining device cannot be observed from outside, which results in the increased number of man-hour.

SUMMARY OF THE INVENTION

The present invention aims at eliminating the drawbacks found in the above-mentioned reclining devices.

Accordingly, it is an object of the invention to provide an improved reclining device which, when a seat back is inclined back horizontally, prevents a level difference in the seat back with respect to a seat cushion and also eliminates the possibility that the back and bottom portions of an occupant may be rubbed by the seat back.

In accomplishing the above object, according to the invention, there is provided a structure in which the main body of a reclining device is incorporated in a slide rail for mounting a seat cushion in such a manner that the seat cushion can be moved longitudinally.

In other words, according to the invention, an upper rail of the slide rail for fixing the seat cushion in its upper position is composed of a pair of right and left rail piece members, there is formed a clearance between these two rail piece members, the reclining device is incorporated in this clearance and a rotary member (for example, a sector gear to be fixed to the back frame) provided on the side of the seat back is rotatably mounted to the reclining device.

Therefore, since a center of rotation around which the seat back is reclined is disposed within the slide rail at a position lower than the seat cushion, the reclining device according to the invention can be located at a lower position than the above-mentioned conventional reclining device.

Thus, in the present invention, even when the seat back is inclined back horizontally, there is produced no difference in level between the seat back and the seat cushion. Also, there is eliminated the possibility that the bottom and back portions of an occupant may be rubbed by the seat back.

It is another object of the invention to improve the mountability of the reclining device to the seat cushion and seat back, and to enhance the workability of the seat back so as to enhance the appearance of the seat.

In order to attain the above object, according to the invention, after a sector gear forming a part of the reclining device is fixed to the back frame of the seat back, a cushion member formed of foam material is applied to the back frame, and these members are then covered with a trim cover assembly to complete the seat back. After completion of the seat back, the sector gear of the seat back is inserted into an upper rail disposed on the side of the seat cushion and is rotatably mounted within the upper rail, so that the sector gear can be brought into engagement with the rail piece members included within the upper rail. As a result of this, since the reclining device is contained within the upper rail and is not exposed externally, the appearance of the seat can be improved. Also, due to the fact that after the sector gear is previously mounted to the back frame of the seat back, the seat back is assembled and then the sector gear is mounted to the upper rail, the mountability of the reclining device to the seat back and seat cushion can be enhanced.

It is still another object of the invention to provide an improved reclining device which can prevent deformation of the sector gear and is improved in strength.

For this purpose, according to the invention, the sector gear fixed to the seat back is interposed between the two rail piece members of the upper rail. Also, the lower end portion of the sector gear can be extended downwardly to a position adjacent to the lower rail, and there can be formed in the extended portion a gear portion intermeshable with a lock gear. For this reason, since the distance between the mounting portion of the sector gear and the gear portion is long, the portion for formation of the gear portion is increased. That is, since a larger number of teeth can be formed in the gear portion, it is possible to provide a reclining device which can provide fine adjustments (the fine adjustments of the angle of inclination of the seat back.

BRIEF DESCRIPTION OF THE DRAWINGS

The above and other objects, features, and advantages of the present invention will be more fully apparent to those of ordinary skill in the art to which this invention pertains from the following detailed description, when considered in connection with the accompanying drawings, in which like reference characters designate like or corresponding parts throughout the several view, and wherein.

DETAILED DESCRIPTION OF A PREFERRED EMBODIMENT OF THE INVENTION

Figure 1:
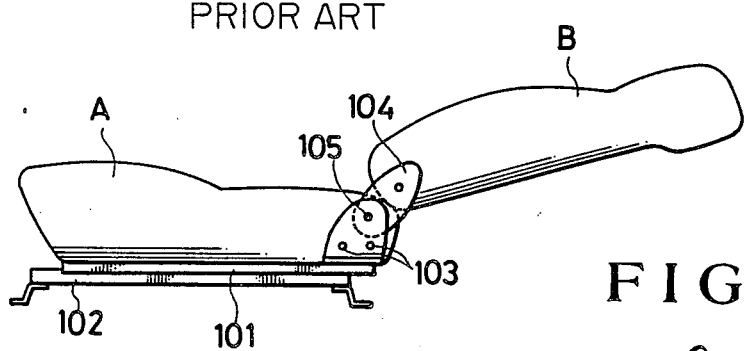
FIG. 1 is a side view of an automotive seat incorporating a conventional reclining device.
Figure 2:
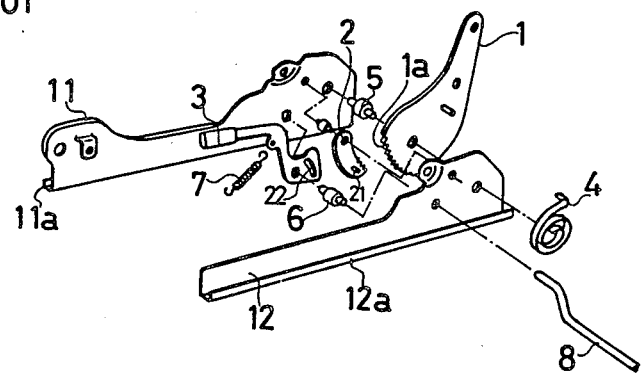
FIG. 2 is an exploded, perspective view of main portions of an embodiment of a reclining device according to the present invention.

Referring first to FIG. 2, there are illustrated an upper rail (10) and main portions (1), (2) - - - of a reclining device to be incorporated within the upper rail (10). The upper rail (10) is formed into one united body by welding two rail piece members (11), (12) together, and the two rail piece members (11), (12) are respectively provided in the lower portions thereof with L-shaped slide portions (11a), (12a) extending outwardly from the lower portions respectively.

Figure 5:
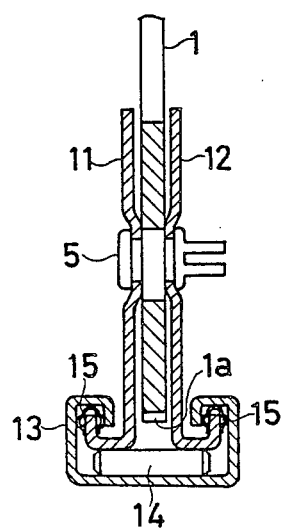
FIG. 5 is a section view taken along line V—V in FIG. 4.
Figure 6:
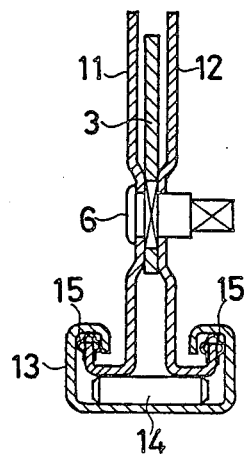
FIG. 6 is a section view taken along line VI—VI in FIG. 4.

The two rail piece members (11), (12) are joined to each other integrally with no clearance therebetween except the respective rear portions thereof. That is, in the respective rear portions, there is formed a clearance within which the above-mentioned reclining device main portions can be incorporated. This clearance can be formed by expanding outwardly either or both of the two rail members (11), (12) (in the illustrated embodiment, both of them are expanded), (FIGS. 5 and 6).

The above-mentioned slide portions (11a), (12a) of the upper rail (10) are slidably fitted into a substantially U-shaped lower rail (13), respectively. In FIGS. 5 and 6, reference character (14) designates a roller formed of metal interposed between the upper and lower rails (10), (13), and (15), (15) respectively designate sliders formed of a plate spring which serve to enhance the slidability of the upper rail (10) as well as to prevent loosened conditions from occurring.

Figure 3:
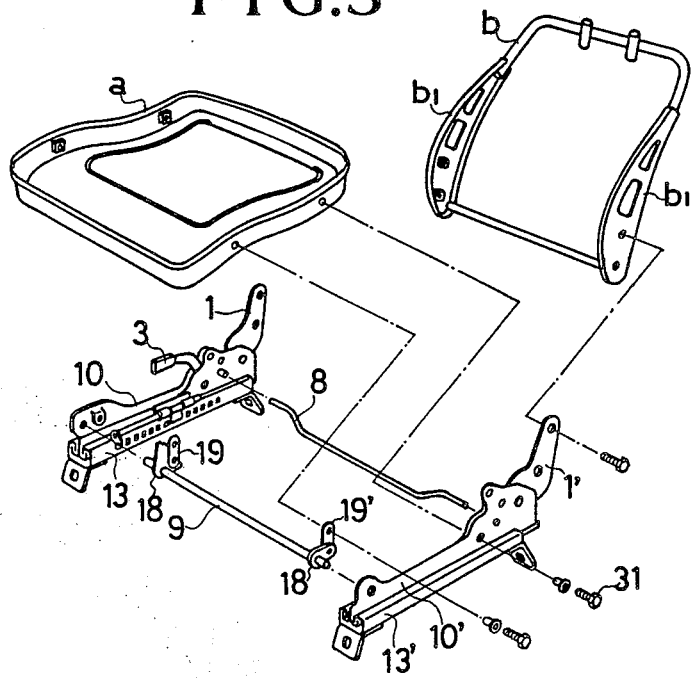
FIG. 3 is an exploded, perspective view of a structure of a seat incorporating a reclining device according to the invention.
Figure 7:
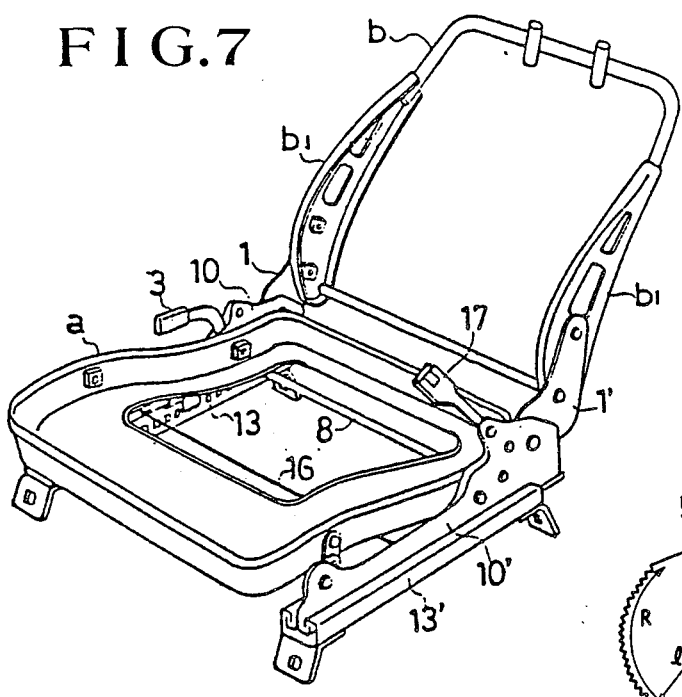
FIG. 7 is a perspective view of a structure of a seat incorporating the reclining device according to the invention.

Referring now to FIG. 3, there is illustrated a state in which a seat frame (a) of a seat cushion (A) and a back frame (b) of a seat back (B) are not yet mounted to right and left slide rails in which the reclining device is already incorporated. In FIG. 7, there is shown a state in which the seat frame (a) and the back frame (b) are already mounted.

In other words, the rear portion of the seat frame (a) of the seat cushion (A) is rotatably mounted to the respective rear portions of the right and left upper rails (10), (10') by means of a bolt (31). Also, the front portion of the seat frame (a) is mounted to the respective front portions of the two upper rails (10), (10') in a vertically movable manner by means of a lifter mechanism interposed between the two upper rails (10), (10') and comprising lifters (18), (19), (18') ---. In the drawings, numeral (9) designates a lifter rod. Further, there is attached to one of upper rails (10') a buckle (17) for mounting a seat belt.

Figure 4:
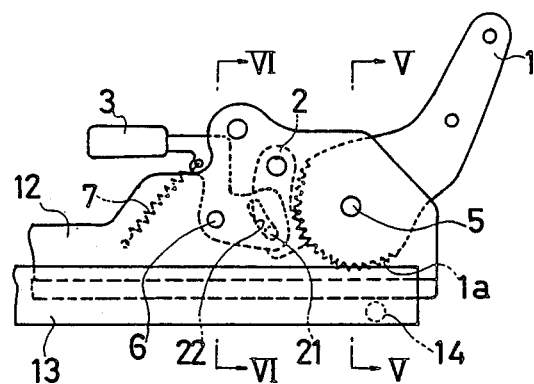
FIG. 4 is a side view of the main portions of the reclining device according to the invention.

The reclining device main portions, as shown in FIG. 4, comprise a sector gear (1) which is formed in the arc-shaped edge portion thereof with a gear portion (1a), a lock gear (2) meshable or engageable with the sector gear, and an operation lever (3) for removing the engaged condition of the lock gear (2) with the sector gear (1).

The above-mentioned sector gear (1) is rotatably mounted to a shaft (5) between the two rail members (11), (12), and is also fastened by rivets to brackets (b1), (b1) respectively fixed to the right and left side portions of the back frame (b) of the seat back (B). Further, the sector gear (1) is energized forwardly, that is, in a direction where the seat back (B) is inclined forwardly, by means of a return spring (4) provided so as to extend across the sector gear (1) and the rail piece member (12).

Figure 8:
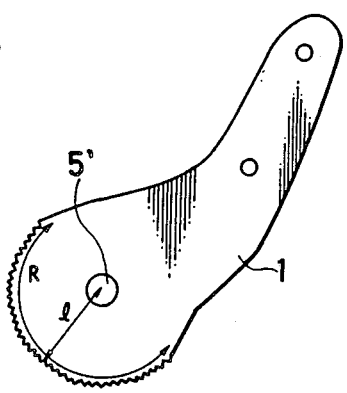
FIG. 8 is a plan view of a sector gear employed in the reclining device according to the invention.
Figure 9:
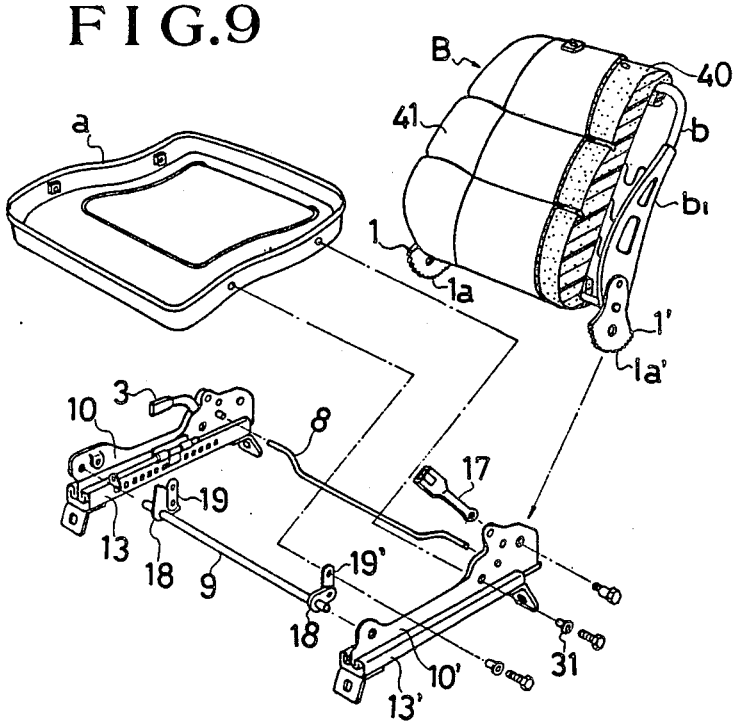
FIG. 9 is an exploded, perspective view of an automotive seat, illustrating a state in which a seat back, after it is completed, is being mounted to two upper rails, with the seat back being cutaway in part for illustration.

Therefore, since when the sector gear (1) is inserted between the two rail piece members (11), (12) a gear portion (1a) formed in the sector gear (1) can extend down to a position adjacent to the roller (14) in the lower rail (13), (FIG. 5), as shown in FIG. 8, a distance (l) between the gear portion (1a) and a portion (5') of the sector gear (1) in which it is mounted to the shaft (5) that is the center of rotation of the sector gear (1) may be longer when compared with a sector gear employed in the conventional reclining device of this type. As a result of this, since the gear portion (1a) of the sector gear (1) can have a long length (R), larger teeth can be formed in the sector gear (1) gear portion (1a) over teeth formed in the conventional sector gear, so that the gear portion (1a) of the sector gear (1) is advantageous in strength over the conventional sector gear. Also, in a case when smaller-sized teeth are provided, since an increased number of smaller teeth can be provided, a fine adjustment of angles of rotation of the sector gear (1) is possible.

In addition, because the center of rotation of the sector gear (1) is the upper rail (10) of the slide rail, the center of rotation of the sector gear (1) is situated at a position lower than the above-mentioned conventional reclining device.

There is provided a lock gear (2) which is adapted to mesh with the above-mentioned gear portion (1a) of the sector gear (1). One end of the lock gear (2) is rotatably mounted between the two rail piece members (11), (12), and on the other end thereof there is provided a pin (21) which is in turn inserted into an elongated hole (22) formed in the operation lever (3). The operation lever (3) is fixed to a connecting rod (8) through a bearing (6) and it biases the lock gear (2) in the locking direction by means of a spring (7). Therefore, if the operation lever (3) is lifted up against the tensile force of the spring (7), then it can be rotated about the bearing (6). With the rotation of the operation lever, the pin (21) of the lock gear (2) is moved to thereby rotate the lock gear (2) in a direction to depart away from the sector gear (1), so that the locked condition is removed. Thus, the sector gear (1) is now rotatable and the seat back can be adjusted to an arbitrary angle of inclination.

Thereafter, if the lifted-up condition of the operation lever (3) is removed, then the operation lever (3) is rotated due to the tensile force of the spring (7) to bring the lock gear (2) into engagement with the sector gear (1), providing a locked condition therebetween, so that the seat back is secured to a predetermined angle of inclination.

After the sector gears (1), (1') are fixed to the back frame (b) in the above-mentioned manner, a cushion member (40) formed of foam material is applied to the back frame (b), and these members are covered with a trim cover assembly (41) to complete the seat back (B), (FIG. 8).

The seat back (B) provided with the sector gears (1), (1') is then mounted between the upper rails (10), (10') of the right and left slide rails.

Figure 10:
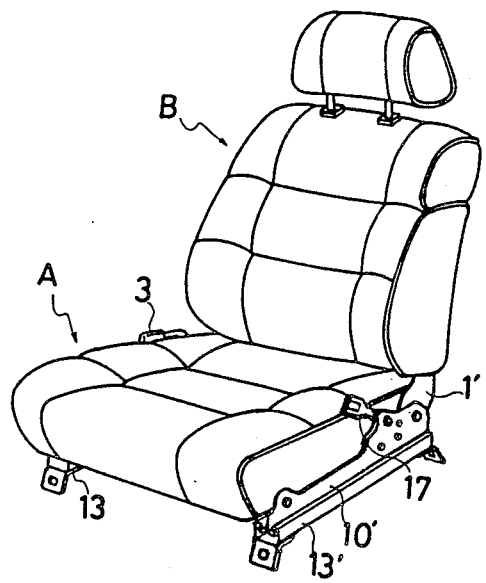
FIG. 10 is a perspective view of an automotive seat which is provided with the reclining device according to the invention; and, FIG. 11 is a side view of an automotive seat provided with the reclining device according to the invention, with the seat back thereof being inclined back horizontally.
Figure 11:
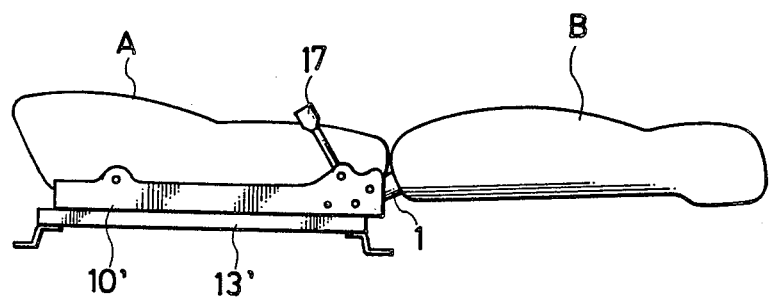

In FIG. 10, there is shown an automotive seat which is provided with the reclining device according to the present invention. In FIG. 11, there is illustrated the automotive seat in which the seat back (B) thereof is inclined back into a horizontal position using the reclining device according to the invention.

The above-mentioned reclining device according to the present invention has the following advantages:

(1) Since an upper rail comprising integrally-formed right and left portions is slidably mounted to a lower rail of a slide rail and the main body of a reclining device is incorporated between the integral right and left portions of the upper rail, the center of rotation of a seat back to be mounted to the reclining device main body for reclining can be located at a lower position when compared with the conventional reclining device.

In other words, while in the conventional reclining device a bracket for mounting the reclining device is fixed to a frame of a seat cushion with a bolt and the center of rotation of a seat back must be located at a position higher than the fixed position of the bracket by the bolt, in the present invention, since there is eliminated the need for provision of the bracket as in the conventional reclining device and a rotary member of the seat back (in the illustrated embodiment, a sector gear) can be rotatably mounted within the above-mentioned upper rail via a shaft, the center of rotation of the rotary member can be at a lower position. For this reason, even when the seat back is inclined back to its horizontal position, the horizontally inclined seat back is flush with the seat cushion, and even when the inclination angle of the seat back is changed there is no possibility that the back and bottom portions of the occupant may be rubbed by the seat back. That is, the seat incorporating the present reclining device can be used in a comfortable manner;

(2) Due to the fact that the rotary member of the seat back is held by and between the right and left side portions, that is, the right and left rail piece members of the above-mentioned upper rail, the rotary member cannot be deformed due to torsional loads and the like applied thereto;

(3) Since the present reclining device is arranged such that it does not project out externally of the seat back, the seat incorporation the present reclining device can provide an improved appearance over the conventional reclining device, is simpler in structure, and can be supplied at lower costs;

(4) Due to the fact that the sector gear of the reclining device is fixed to the back frame of the seat back prior to assembly of the seat back, the mountability of the present reclining device as well as the assemblage of the seat back can be improved, when compared with the conventional reclining device which is mounted to a seat back after the seat back is assembled.

That is, according to the prior art reclining device, there is required the number of man-hour to mount the reclining device to the mounting portions in the seat frame which are covered with a trim cover assembly. However, according to the present invention, there is eliminated the need for such number of man-hour. Also, since there is eliminated the need that mounting holes for mounting the reclining device are formed in the back frame and the cushion member respectively forming the seat back and that the seat back is assembled such that the mounting holes can be located at their predetermined positions, the assemblage or assembling efficiency can be enhanced;

(5) Owing to the fact that the fixed position of the sector gear is disposed within the seat back, the sector gear and rivets for fixing the sector gear do not project out externally of the seat, resulting in the enhanced safety of the seat; and, (6) Since the upper portion of the sector gear is located within the seat back and also since the lower portion and a member for limiting the rotational movements of the sector gear are located within the upper rail of the slide rail, they are not exposed outwardly of the seat to enhance the appearance of the seat.

Although the invention has been described in its preferred form with a certain degree of particularity, it is obvious to those skilled in the art that the principal characteristics of the invention can be easily understood and also that various changes and modifications may be made in the invention so as to apply the invention to various uses and conditions without departing from the spirit and scope thereof.

What is claimed is:

1. A reclining device for use in an automotive seat, comprising:
   a pair of right and left seat adjusters, each of said adjusters having an upper rail formed of two rail piece members and a lower rail, said upper rail being slidably fitted in said lower rail;
   a rotary member being interposed between said rail piece members of said upper rail, said rotary member having one portion fixed to a seat back and a second portion with a means for engaging which extends into said lower rail so that the seat back can be reclined in a horizontal position level with the horizontal surface of said seat; and
   a means for locking said rotary member, said locking means meshing with said engaging means.

2. A reclining device as set forth in claim 1, wherein said engaging means of said rotary member and said locking means comprise a sector gear which extends into said lower rail, a lock gear engagable with said secter gear, and an operation lever for removing the engagement of said lock gear with said sector gear, said sector gear having one end fixed to said seat back with the other end thereof being rotatably mounted between said two rail piece members of said upper rail, and said lock gear and part of said operation lever are located between said two rail piece members of said upper rail.

3. A reclining device as set forth in claim 2, wherein said seat back is assembled after said sector gear is mounted to a seat back frame, and said seat back can be mounted to two slide rails by rotatably mounting said sector gear of said seat back to said upper rail.

4. A reclining device as set forth in claim 2, wherein said lock gear engageable with said gear section of said sector gear is disposed within said clearance between said two rail piece members of said upper rail, with one end thereof being rotatably mounted between said two rail piece members and the other end thereof engaged with said gear section of said sector gear, there is provided a pin on the side surface of said other end of said lock gear, said pin is inserted into an elongated hole formed in said operation lever, and said operation lever is energized by a spring so that said lock gear can be brought into engagement with said gear section of said sector gear.

5. A reclining device as set forth in claim 1, wherein said two rail piece members are connected integrally to each other except in the respective rear portions thereof, and, between said respective rear portions, there is formed a clearance for containing said reclining device therein.

6. A reclining device as set forth in claim 1, wherein said two rail piece members of said upper rail are respectively provided in the lower portions thereof with L-shaped slide sections respectively extending outwardly from said respective lower portions, and said two slide sections are slidably fitted into said lower rail.

7. A reclining device as set forth in claim 1, wherein a seat cushion frame is mounted to and between said two upper rails of said right and left seat adjusters.

* * * * *